US008620926B2

(12) United States Patent
Golwalkar et al.

(10) Patent No.: US 8,620,926 B2
(45) Date of Patent: Dec. 31, 2013

(54) USING A HASHING MECHANISM TO SELECT DATA ENTRIES IN A DIRECTORY FOR USE WITH REQUESTED OPERATIONS

(75) Inventors: Yogesh Vilas Golwalkar, Maharashtra (IN); Kristin Marie Hazlewood, Austin, TX (US); Magesh Rajamani, Maharashtra (IN); Gary Dale Williams, Driftwood, TX (US)

(73) Assignee: International Business Machines Corporation, Armonk, NY (US)

( * ) Notice: Subject to any disclaimer, the term of this patent is extended or adjusted under 35 U.S.C. 154(b) by 1366 days.

(21) Appl. No.: 12/013,535

(22) Filed: Jan. 14, 2008

(65) Prior Publication Data

US 2009/0182855 A1 Jul. 16, 2009

(51) Int. Cl.
*G06F 17/30* (2006.01)
*G06F 7/00* (2006.01)

(52) U.S. Cl.
USPC ........... 707/747; 707/694; 707/698; 707/741; 707/754

(58) Field of Classification Search
None
See application file for complete search history.

(56) References Cited

U.S. PATENT DOCUMENTS

| 6,016,499 | A | 1/2000 | Ferguson |
| 6,473,774 | B1* | 10/2002 | Cellis et al. ........................... 1/1 |
| 2005/0102297 | A1 | 5/2005 | Lloyd et al. |
| 2005/0240553 | A1* | 10/2005 | Diggs et al. ....................... 707/1 |
| 2005/0267857 | A1* | 12/2005 | Harvey et al. .................... 707/1 |
| 2006/0248117 | A1 | 11/2006 | Bell et al. |
| 2008/0243879 | A1* | 10/2008 | Gokhale et al. ............... 707/100 |

OTHER PUBLICATIONS

Zeilenga, "Lightweight Directory Access Protocol (LDAP) Assertion Control", RFC 4528, OpenLDAP Foundation, Jun. 2006, pp. 1-6.

* cited by examiner

*Primary Examiner* — Sangwoo Ahn
(74) *Attorney, Agent, or Firm* — Yee & Associates, P.C.; Jeffrey S. LaBaw

(57) ABSTRACT

In association with a data processing system that includes one or more servers, one or more clients and a partitionable distributed directory contained in a database, a computer implemented method is provided for selectively processing data entries that reside in the directory. The method comprises the steps of generating a request to perform an operation on each data entry in a specified group of intended entries, and specifying a hashing control index that uniquely identifies each entry of the specified group, and excludes all other entries. The requested operation is applied only to data entries in the directory that are identified by the specified hashing control index.

19 Claims, 4 Drawing Sheets

USING A HASHING MECHANISM TO SELECT DATA ENTRIES IN A DIRECTORY FOR USE WITH REQUESTED OPERATIONS

BACKGROUND OF THE INVENTION

1. Field of the Invention

The invention disclosed and claimed herein generally pertains to a method for selecting or identifying data entries for requested operations, wherein the entries are contained in a directory that may be partitioned. More particularly, the invention pertains to a method of the above type wherein a specified hashing control index is defined and used to filter an operation request, so that the request will apply only to entries that reside in a particular partition or partitions of the directory. Even more particularly, the invention pertains to a method of the above type that can be requested either by a client that requests an operation, or by an associated server's configuration, so that clients need not be involved in the hashing procedure.

2. Description of the Related Art

The Lightweight Directory Access Protocol (LDAP) is an application protocol designed for use in querying and modifying directory services in a Transmission Control Program/Internet Protocol (TCP/IP) environment. These directory services are associated with a directory in the form of a set of information objects with similar attributes organized in a logical and hierarchical manner. A very common example is a standard telephone directory, in which a series of names are arranged alphabetically, together with an associated street address and phone number. An LDAP directory tree may also reflect other methods of organization, depending on the model chosen.

LDAP deployments typically use Domain Name System (DNS) names for structuring the upper levels of the naming hierarchy, while inside the directory other data entries are found which represent leaf-like entries (or multiple data entries). A data entry generally consists of a set of attributes, wherein an attribute has a name such as an attribute type or description, accompanied by one or more associated values. Each entry has a unique identifier known as the Distinguished Name (DN) of the entry. The Distinguished Name for a particular data entry consists of a Relative Distinguished Name (RDN), derived from the attributes of the particular entry, and the Distinguished Name for the parent entry of the particular data entry. The data content of the tree structure grows, as entries or attributes are successively added thereto.

In a distributed LDAP directory, each data entry is placed or distributed into one of multiple partitions, using a DN hashing procedure. In such procedure, a data entry is partitioned based on hashing the RDN part of the entry DN, to provide a corresponding value. Based on this value, the entry DN is placed into a hashing function, or algorithm, which then assigns the entry to a partition.

In an LDAP directory, it is frequently necessary to require that certain LDAP operations are to be performed on some of the data entries in the directory, but not on others. Searches, adds, and modifications are examples of such operations that may be requested. However, there is currently no mechanism available for filtering an operation request that is based on hashing, that is, applying a hashing algorithm to the DN values of respective entries, in order to select only the intended data entries for the request. Filtering techniques currently available in LDAP to perform this task rely on specific attributes within the entries, and thus tend to be comparatively inefficient.

SUMMARY OF THE INVENTION

In association with a data processing system that includes one or more servers, one or more clients and a partitionable distributed directory contained in a database, a computer implemented method is provided for selectively processing data entries that reside in the directory. The method comprises the steps of generating a request to perform an operation on each data entry in a specified group of intended entries, and specifying a hashing control index that uniquely identifies each entry of the specified group, and excludes all other entries. The requested operation is applied only to data entries in the directory that are identified by the specified hashing control index.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
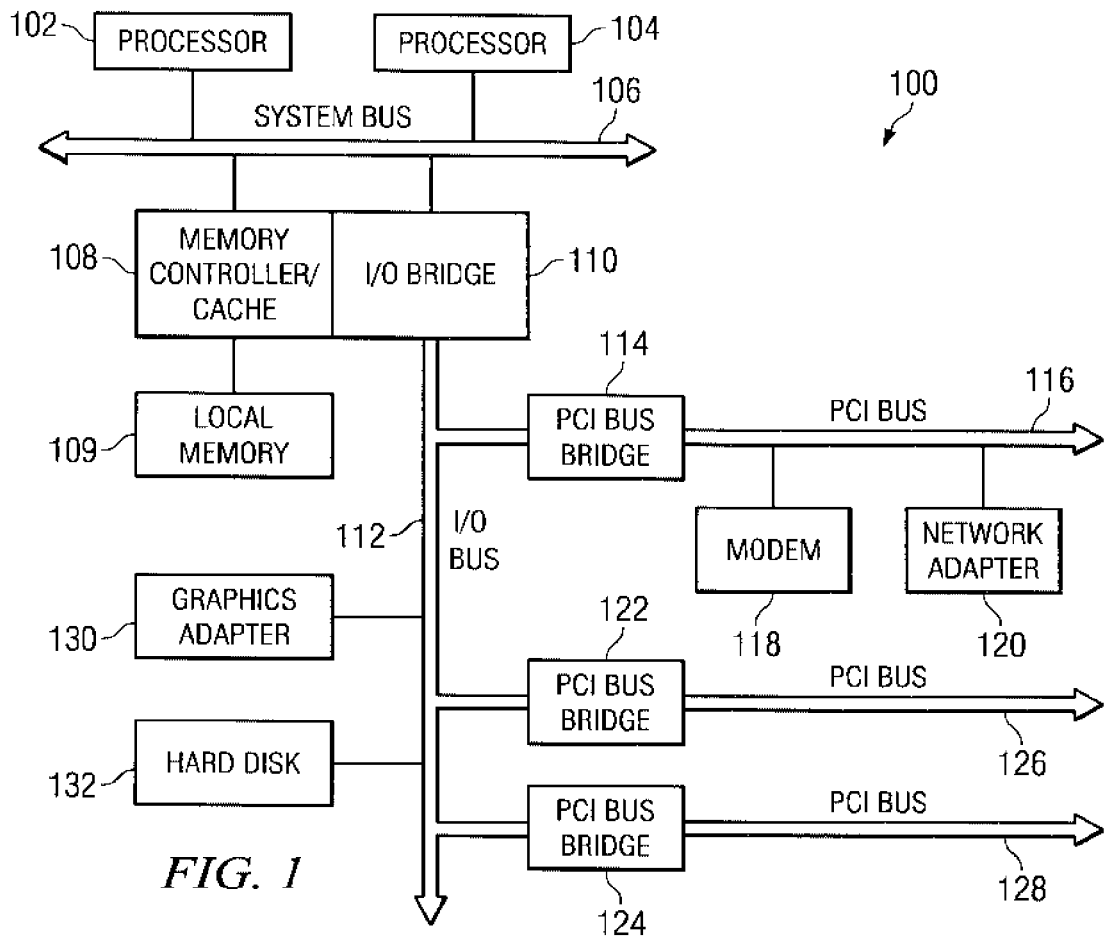
FIG. 1 is a block diagram showing a computer or data processing system that may be used in implementing embodiments of the invention.

Referring to FIG. 1, there is shown a data processing system 100 that may be used in implementing embodiments of the present invention. Data processing system 100 may be a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 109. I/O bus bridge 110 is connected to system bus 106 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local bus 116. A number of modems such as modem 118 may be connected to PCI bus 116. Typical PCI bus implementations will support four PCI expansion slots or add-in connectors. Communications links to network computers may be provided through modem 118 and network adapter 120 connected to PCI local bus 116 through add-in boards.

Additional PCI bus bridges 122 and 124 provide interfaces for additional PCI buses 126 and 128, from which additional modems or network adapters may be supported. In this manner, system 100 allows connections to multiple network computers. The replication of systems and connections among them may be used to form a collection of interconnected distributed systems such as those comprising distributed directory services servers in accordance with an embodiment of the present invention. A memory mapped graphics adapter 130 and hard disk 132 may also be connected to I/O bus 112 as depicted, either directly or indirectly.

Those of ordinary skill in the art will appreciate that the hardware depicted in FIG. 1 may vary. For example, other peripheral devices, such as optical disk drives and the like also may be used in addition or in place of the hardware depicted. The depicted example is not meant to imply architectural limitations with respect to the present invention.

The data processing system depicted in FIG. 1 may be, for example, an IBM RISC/System 6000 system, a product of International Business Machines Corporation in Armonk, N.Y., running the Advanced Interactive Executive (AIX) operating system.

Figure 2:
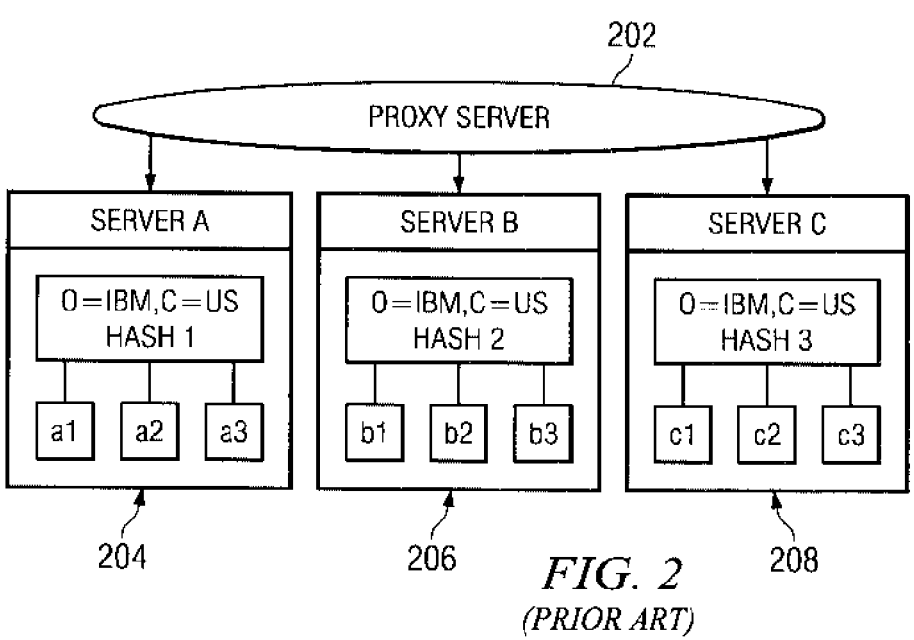
FIG. 2 is a schematic diagram that shows a conventional proxy server and multiple back-end servers in a distributed directory.

Referring to FIG. 2, there is shown a conventional proxy server 202, which comprises a specialized LDAP server. To accommodate increasing amounts of data in a directory, proxy server 202 typically distributes the data into multiple or "n" back-end servers. The proxy server partitions the data into multiple sub-trees, and moves them into different back-end servers. By way of example, FIG. 2 shows proxy server 202 in communication with three back-end directory servers 204, 206 and 208, illustrating a split in data across three partitions.

Each of the servers 204, 206 and 208 has a representative tree-like structure that depicts the data content within its corresponding partition. A server 204 (server A) contains data entries (a1,a2,a3). Similarly, server 206 (server B) and server 208 (server C) contain data entries (b1,b2,b3) and (c1,c2,c3), respectively. The entry "o=ibm, c=us", which is present on all of the partitions, is the target partition, or the base entry on which partitioning is done. Entries that are immediately below "o=ibm, c=us", for example, "cn=joseph, o=ibm, c=us", can be initially assigned to any of the back-end servers 204-208. However, after such entry has been assigned to a particular server, such as server 204, all entries below "cn=joseph, o=ibm, c=us" will go only to that particular back-end server. A hashing algorithm or hashing function, implemented by proxy server 202, determines which back-end server will hold the entry "cn=joseph, o=ibm, c=us". Accordingly, whenever operations are requested in the directory arrangement shown by FIG. 2, the proxy server must internally perform the hashing logic, to ensure that the request goes to the correct one of the servers 204-208. That is, when the proxy server 202 receives a request pertaining to an entry, in order to perform an LDAP operation thereon, the proxy server must first locate the entry, in the particular back-end server where the partitioned entry resides.

Figure 3:
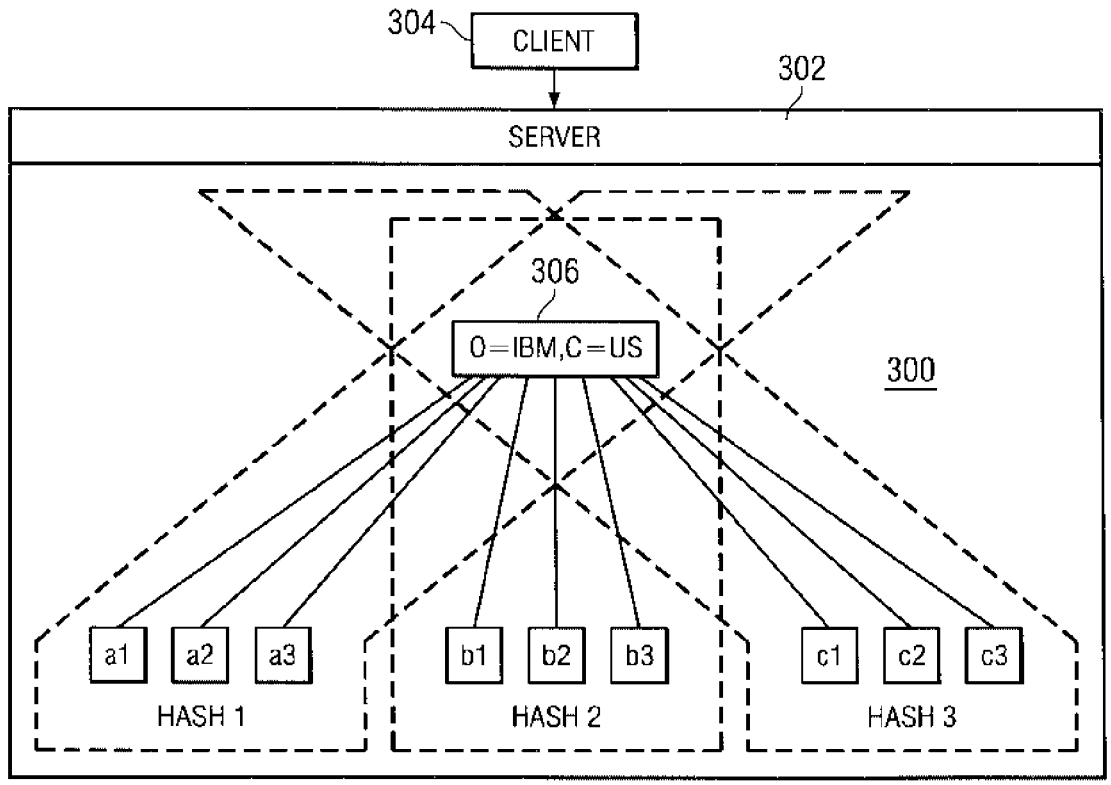
FIG. 3 is a schematic diagram that shows a single server in a directory with partitionable data entries, for use in illustrating embodiments of the invention.

Referring to FIG. 3, there is shown a single directory 300 for illustrating an embodiment of the invention, wherein the directory has a single associated server 302. Directory 300 contains the data entries respectively shown in the directory of FIG. 2, but server 302 is a conventional directory server and not a proxy server. FIG. 3 further shows a client 304 connected to server 302, wherein client 304 may have different forms as described hereinafter. Client 304 sends or submits requests to server 302, to perform operations on a specified group or subset of the entries in directory 300.

In order to significantly improve the process of locating such entries, referred to herein as target entries, embodiments of the invention attach a hashed target entry control, or hashing control, to each operation request. More specifically, the LDAP protocol defines a control format, which the client 304 sends to the server 302 along with each request to operate upon specified entries. This format allows three data values to be encoded into the control, wherein the three values respectively indicate a target partition, a number of partitions and a sub-tree DN for the target entry. These values of the hashing control collectively comprise a hashing control index.

By means of the hashing control index values, server 302 can carry out a procedure, similar to the entry locating procedure in the partitioned arrangement of FIG. 2, in order to identify the specified target entries. However, the need for a proxy server and multiple back-end servers is eliminated. Thus, server 302 is configured to implement a hashing algorithm, which can be statically defined or alternatively may be configurable via a plug-in. Only entries whose DN values match or hash to the values of the hashed target entry control will be selected for use in processing a request corresponding to the control. The client 304 can therefore use the control to inform the server 302 that a requested LDAP operation will apply only to the entries in a particular hash partition, wherein the partition, or virtual partition, is uniquely defined by the hashing control index. As an example, if a search request would nominally include all entries under "o=ibm, c=us", but the hashing control index limits the request to the data entries (a1,a2,a3), the hashing control index is used, together with the partition defining procedure, to find these specific data entries wherever they are located. The hashing control index thus acts to filter out other entries, defined by the index as being in other virtual partitions which are not pertinent to the requested operation.

In order to implement the hashing control in a distributed directory environment, the data is split based on the hashing of the RDN immediately to the left of the split point or sub-tree DN of a target entry. When the server 302 receives the hashed target entry control, before applying the requested LDAP operation to the target entry, the RDN immediately to the left of the split point DN is hashed using the value for the number of partitions specified by the hashing control index. The resulting value is compared to the target partition value specified by the index, and if the values match, the operation is applied to the target entry. The term "hashing", as used herein, generally refers to a procedure carried out by a hashing, or mapping, algorithm.

FIG. 3 shows respective data entries all coming off of, or descending from, the target partition 306. Server 302 may be a physical server or may be a single physical instance of an LDAP server, and respective entries may be randomly located throughout the server 302. FIG. 3 further shows data entries (a1,a2,a3), (b1,b2,b3) and (c1,c2,c3), respectively grouped together as hash 1, hash 2 and hash 3. This is achieved by defining a given set of data entries on the basis of both the partitioning procedure, and the hashing control index for the given set. FIG. 3 thus illustrates how different entries stored on the same physical server can readily be ordered or assembled, according to the partitions they would be assigned to if partitioning was to be carried out. As described above, a particular partition is associated with a particular hashing control index. Thus, by means of the index, entries associated with a particular partition or hash group may be readily distinguished from those of another. Accordingly, the hashed target entry control acts as a filter, to apply a requested operation only to intended entries. This control can be used to perform LDAP operations that include, for example, search, add, modify and delete operations.

It is seen that the single server 302 performs functions of both the proxy server 202 and back-end servers 204-208. Also, client 304 could be a client that was remotely located from server 302. Client 304 could alternatively be a proxy server, such as proxy server 202 of FIG. 2.

In another embodiment of the invention, the server is provided with a start up option, whereby the server will only process entries for a requested operation that map or hash to, or that are identified by, a specified hashing control index. This capability provides a mechanism that filters respective entries at the server level. Thus, it is not necessary for clients that submit operation requests to be involved in the hashing procedure.

Figure 4:
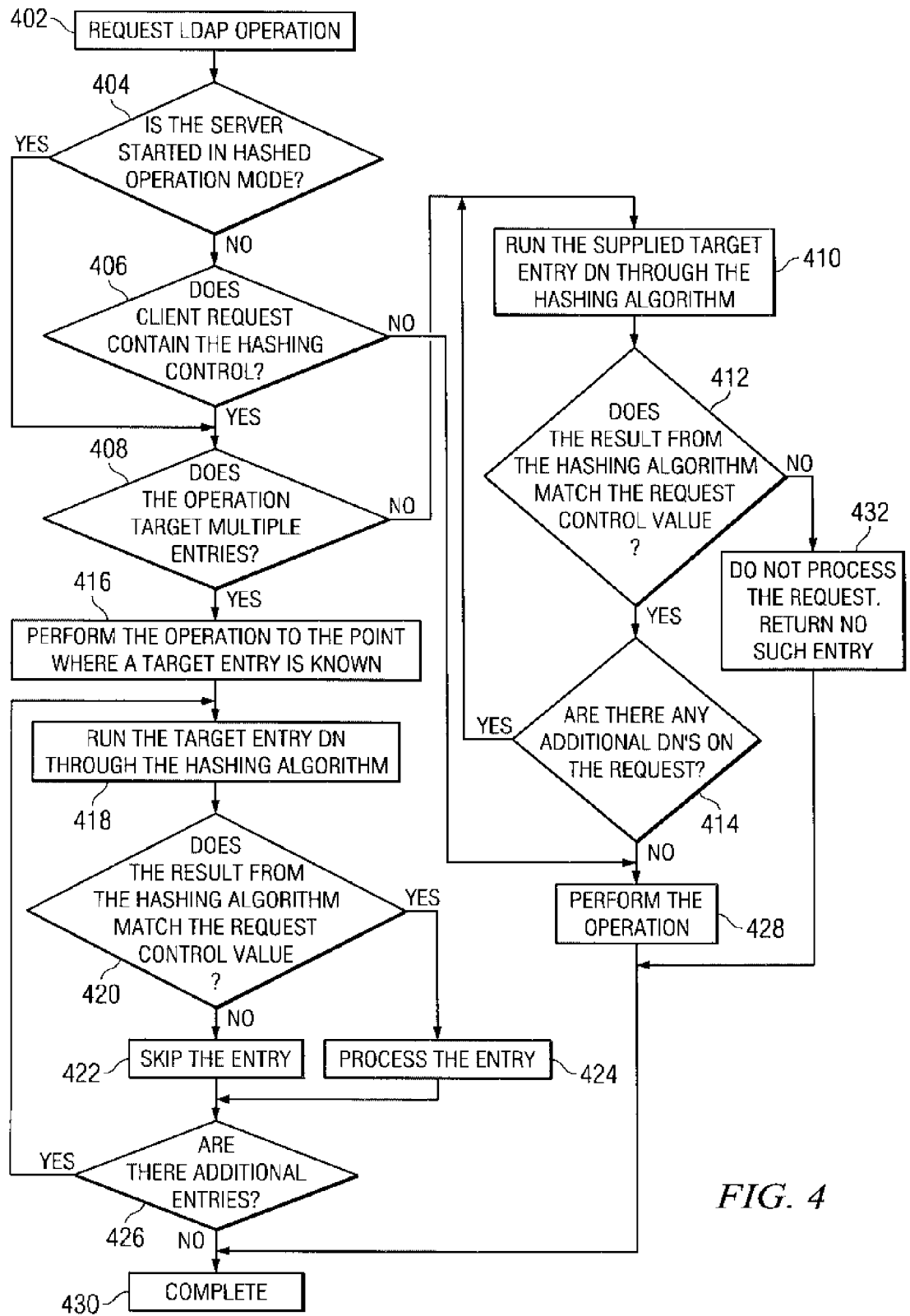
FIG. 4 is a flowchart showing respective steps for an embodiment of the invention.

Referring to FIG. 4, there is shown a flowchart depicting principal steps for embodiments of the invention. Step 402 shows an LDAP operation requested by a client, wherein the request is associated with a hashing control index as described above. At step 404, it is necessary to determine whether or not the server is started up in a hashed operations mode, so that it will only process entries that map to a DN value defined by the hash control index, as likewise described above.

If the server is not started up in such mode, it is the responsibility of the client submitting the request to include a hashed target entry control, to indicate that the intended target entries are associated with a particular hash partition. Thus, at step 406 it is determined whether the client operation request includes such hashing control. If not, the requested operation is performed at step 428 in a conventional manner, and the procedure of FIG. 4 ends. Otherwise, the procedure moves to step 408, to determine whether the requested operation has targeted multiple data entries. The procedure will also move to step 408 directly from step 404, if the result of step 404 is positive.

Step 408 indicates that if there is only a single target entry, rather than multiple entries, the DN of the target entry is run through the hashing algorithm at step 410. The value generated by the algorithm is then compared with the value supplied by the hashing control index, at step 412. If the two values do not match, a decision is made at step 432 to not apply the requested operation to the entry, and the procedure of FIG. 4 ends. If the two values do match, the request is checked at step 414, to see if it contains any additional entry Distinguishing Names. For example, a modify DN request targets a single entry, but contains two Distinguished Names. If there are no additional DNs, the requested operation is applied to the single target entry, at step 428. Otherwise, the procedure is routed back to step 410.

Referring further to FIG. 4, if it is determined at step 408 that the requested operation has targeted multiple entries, the operation is performed at step 416, until a target entry has become known. At step 418, the DN of such target entry is run through the hashing algorithm. Then, at step 420 the resulting value provided by the algorithm is compared with a value supplied by the hash control index. If the two values do not match, the entry is skipped or disregarded, as shown by step 422. Otherwise, the entry is processed at step 424 in accordance with the requested operation. Following either step 422 or 424, it is necessary to determine at step 426 whether there are any more target entries to consider. If not, the procedure ends at step 430. If there is one or more additional entries, the procedure is routed back to step 418.

Figure 5:
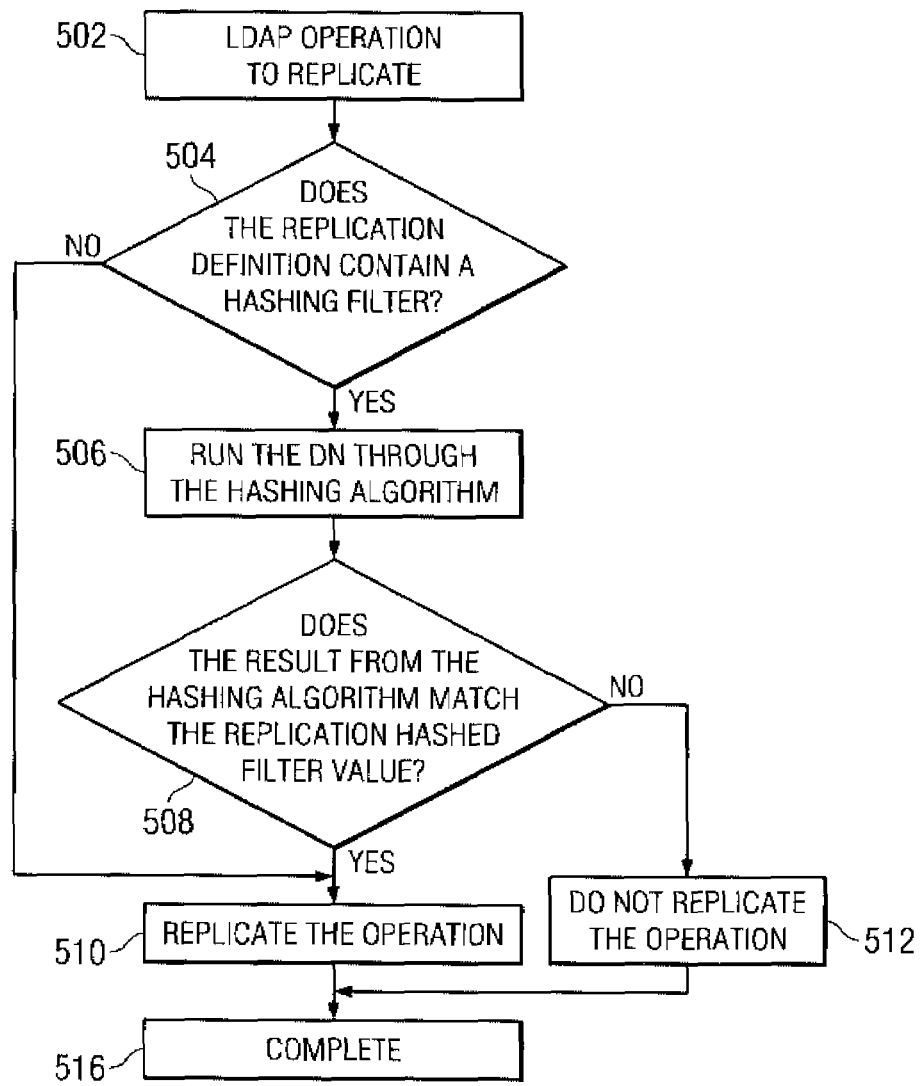
FIG. 5 is a flowchart showing respective steps for a further embodiment of the invention.

Referring to FIG. 5, there is shown a flowchart directed to further embodiments of the invention that pertain to replication in an LDAP environment. In such environment, there may be a replication agreement specifying that replication should only occur when the target entry hashes to a specific value defined by the index of a hashed target entry control, as described above, which is provided along with the replication. This arrangement, if present, comprises a hashing filter.

FIG. 5 shows an LDAP operation to replicate being received at step 502. Step 504 determines whether the replication contains a hashing filter. If not, the operation is replicated at step 510 in a normal or conventional manner. However, if the replication does contain a hashing filter, the DN of the target entry is run through a hashing algorithm at step 506. The resulting value generated by the algorithm is then compared with the value specified for the hashing filter at step 508. If the two values match, the operation is replicated at step 510, and at step 516 the procedure ends. Otherwise, the operation is not replicated, as shown at step 512.

Figure 6:
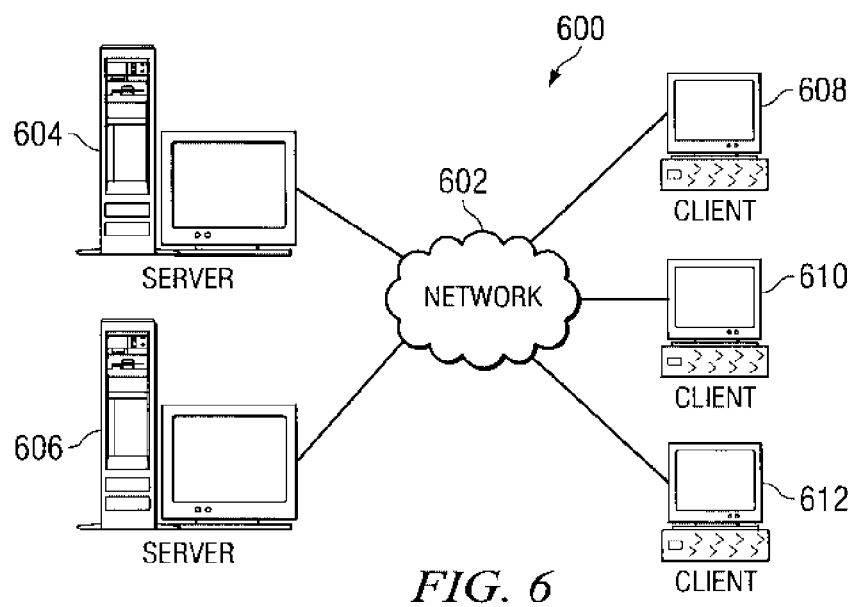
FIG. 6 is a block diagram that shows a distributed network data processing system in which embodiments of the invention may be implemented.

Referring to FIG. 6, there is shown a system 600, comprising interconnected components, in which embodiments of the present invention may be implemented. System 600 contains a network 602, which is the medium used to provide communication links between various devices and computers connected together within system 600. Network 602 may include connections such as wire, wireless communication links, or fiber optic cables.

In the depicted example, server 604 and server 606 connect to network 602, along with clients 608, 610, and 612. These clients 608, 610, and 612 may be, for example, personal computers or network computers that are clients to server 604 or 606. System 600 may include additional servers, clients, and other devices not shown. Servers 604 and 606 and clients 608-612 could comprise respective adaptations of data processing system 100 shown in FIG. 1.

Usefully, each of the servers 604-606 and clients 608-612 includes sufficient computer storage media to store all software needed to implement embodiments of the invention, wherein the software comprises program code, machine code instructions or other software code or instructions. Each server and client also has the capability to send or receive such software through network 602, such as to download the software from a selected server to a selected client, in connection with an embodiment of the invention.

In FIG. 6, network 602 could be the Internet representing a worldwide collection of networks and gateways that use the Transmission Control Protocol/Internet Protocol (TCP/IP) suite of protocols to communicate with one another. Alternatively, network 602 could be an intranet, a local area network (LAN), or a wide area network (WAN). FIG. 6 is intended as an example, and not as an architectural limitation for different embodiments of the present invention.

In yet another embodiment of the invention, certain utilities that load and unload data into a directory server provide an option to specifically request entries that map to a specific value provided by a hashing control index as described above. Before loading or unloading of an entry, the hashing algorithm is applied to the entry, to determine whether the entry will be loaded or unloaded.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In association with a data processing system that includes one or more servers, one or more clients and a partitionable directory contained in a database, a computer implemented method for selectively processing data entries that reside in the directory, wherein said method comprises the steps of:
generating a request to perform an operation on each data entry in a specified group of intended entries, wherein the request includes a hashing control index that uniquely identifies each entry of said specified group, and excludes all other entries; and
filtering the request using the hashing control index specified in the request such that said requested operation is only applied to data entries in said directory that are identified by said specified hashing control index, wherein said hashing control index included in the request represents a target partition value, a number of partitions, and a value that indicates a sub-tree Distinguished Name of a target partition split point or target partition base.

2. The method of claim 1, wherein:
each entry of said intended group resides in a partition of said directory that is identified by said hashing control index, wherein said directory includes multiple real or virtual partitions, selectively, and a single server is configured to apply a requested operation to entries residing in any of said partitions.

3. The method of claim 1, wherein:
said operation request and said hashing control index are generated by a requesting client, and said requesting client provides said request with a mechanism that will apply said request only to entries identified by said specified hashing control index.

4. The method of claim 3, wherein:
said mechanism comprises a hashed target entry control that includes said hashing control index, wherein said hashing control index represents one or more specified values.

5. The method of claim 4, wherein:
said operation request is received by a server configured with a hashing algorithm for implementing said request.

6. The method of claim 5, wherein:
said server receiving said operation request is started up in a mode whereby said server applies said request only to entries that are identified by said hashing control index.

7. The method of claim 1, wherein:
said requested operation is replicated to entries that are respectively identified by said hashing control index.

8. The method of claim 1, wherein:
a utility, used to selectively load and unload data into a directory server of said directory, is configured to apply a particular load or unload operation only to said entries that are identified by said hashing control index.

9. The method of claim 1, wherein:
said requested operation is selected from a group of operations that includes at least search, add, modify, delete and extended operations.

10. The method of claim 1, wherein:
said directory is provided with a Lightweight Directory Access Protocol.

11. In association with a data processing system that includes one or more servers, one or more clients and a partitionable directory contained in a database, a computer program product embodied in a non-transitory computer readable storage medium for selectively processing data entries that reside in the directory, wherein said computer program product comprises:
instructions for generating a request to perform an operation on each data entry in a specified group of intended entries, wherein the request includes a hashing control index that uniquely identifies each entry of said specified group, and excludes all other entries; and
instructions for filtering the request using the hashing control index specified in the request such that said requested operation is only applied to data entries in said directory that are identified by said specified hashing control index, wherein said hashing control index included in the request represents a target partition value, a number of partitions, and a value that indicates a sub-tree Distinguished Name of a target partition split point or target partition base.

12. The computer program product of claim 11, wherein:
said operation request and said hashing control index are generated by a requesting client, and said requesting client provides said request with a mechanism that will apply said request only to entries identified by said specified hashing control index.

13. The computer program product of claim 12, wherein:
said mechanism comprises a hashed target entry control that includes said hashing control index, wherein said hashing control index represents one or more specified values.

14. The computer program product of claim 11, wherein:
said instructions are stored in a non-transitory computer readable storage medium in a data processing system, wherein the instructions were downloaded over a network from a remote data processing system.

15. The computer program product of claim 11, wherein:
said instructions are stored in a non-transitory computer readable storage medium in a server data processing system, wherein the instructions are downloaded over a network to a remote data processing system and used in a non-transitory computer readable storage medium with the remote system.

16. In association with a data processing system that includes one or more servers, one or more clients and a partitionable directory contained in a database, an apparatus for selectively processing data entries that reside in the directory, wherein said apparatus comprises a data processor coupled to a memory and configured to execute instructions in the memory to perform steps of:

generating a request to perform an operation on each data entry in a specified group of intended entries, wherein the request includes a hashing control index that uniquely identifies each entry of said specified group, and excludes all other entries; and filtering the request using the hashing control index specified in the request such that said requested operation is only applied to data entries in said directory that are identified by said specified hashing control index, wherein said hashing control index included in the request represents a target partition value, a number of partitions, and a value that indicates a sub-tree Distinguished Name of a target partition split point or target partition base.

17. The apparatus of claim 16, wherein:

said operation request and said hashing control index are generated by a requesting client, and said requesting client provides said request with a mechanism that will apply said request only to entries identified by said specified hashing control index.

18. The apparatus of claim 17, wherein:

said mechanism comprises a hashed target entry control that includes said hashing control index, wherein said hashing control index includes one or more specified values.

19. The apparatus of claim 16, wherein:

a server is configured to receive said operation request, and is started up in a mode wherein said server applies said request only to entries that are identified by said hashing control index.

* * * * *